United States Patent [19]

Izutani et al.

[11] Patent Number: 4,539,108
[45] Date of Patent: Sep. 3, 1985

[54] FUEL HEATING TYPE FUEL FILTER DEVICE

[75] Inventors: Kouji Izutani, Anjo; Isamu Shigeta, Toyota; Akio Nara, Okazaki; Hidetaka Hayashi, Nagoya, all of Japan

[73] Assignee: Nippondenso Co., Ltd., Kariya, Japan

[21] Appl. No.: 599,275

[22] Filed: Apr. 11, 1984

[30] Foreign Application Priority Data

Apr. 12, 1983 [JP] Japan ................... 58-64950

[51] Int. Cl.³ ............... F02M 31/00; B01D 23/00
[52] U.S. Cl. .................... 210/104; 210/134; 210/149; 210/184; 210/186; 123/557
[58] Field of Search .............. 210/96.1, 103, 104, 210/109–111, 123, 134, 135, 149, 184–186, 416.4; 123/557

[56] References Cited

U.S. PATENT DOCUMENTS

| 3,278,032 | 10/1966 | Smith | 210/186 X |
|---|---|---|---|
| 4,091,265 | 5/1978 | Richards et al. | |
| 4,321,136 | 3/1982 | Matsui | |
| 4,387,691 | 6/1983 | Marcoux et al. | 123/557 |
| 4,406,785 | 9/1983 | Siefer | 210/186 |
| 4,437,986 | 3/1984 | Hutchins et al. | 210/149 X |
| 4,477,715 | 10/1984 | Bell et al. | 210/184 X |
| 4,495,069 | 1/1985 | Davis | 210/149 X |
| 4,501,255 | 2/1985 | Van Der Ploeg et al. | 123/557 |

FOREIGN PATENT DOCUMENTS 0051936  5/1982  European Pat. Off. .

Primary Examiner—Thomas Wyse
Attorney, Agent, or Firm—Cushman, Darby & Cushman

[57] ABSTRACT

A fuel filter device for use with diesel engines has a manually operable pump section and a filter container housing therein a filter element and detachably attached to the pump section. The pump section has a manually operable diaphragm facing a chamber having fuel inlet and outlet respectively communicated with a fuel tank and the filter container. The inlet and outlet are provided with valves responsive to the fuel pressure at the inlet and to a pressure variation caused by the diaphragm in the chamber to allow the fuel to flow through the inlet into the chamber and through the outlet into the container in which the fuel flows through the filter element and out of the container to a discharge port of the pump section. An electric heater is disposed in the chamber adjacent to the path of the flow of the fuel in the chamber. A fuel temperature or pressure sensor is disposed downstream of the filter element to provide a signal for the control of the electrical supply to the heater.

10 Claims, 14 Drawing Figures

FUEL HEATING TYPE FUEL FILTER DEVICE

BACKGROUND OF THE INVENTION

1. Field of the Invention

The present invention relates to a fuel filter device of fuel heating type which is suitable for use in vehicles equipped with diesel engines.

2. Description of the Prior Art

The fuel used with diesel engines, i.e., light oil, tends to be solidified into wax-like state when cooled down below $-10°$ C., causing clogging of the fuel filter, which impairs the smooth operation of the engines due to insufficient supply of the fuel.

To obviate this problem, a fuel filter device has been proposed which has a heating element provided on the bottom of the filter container to heat the fuel therein. This type of filter is shown, for example, in U.S. Pat. No. 4,321,136.

This known filter device, however, has disadvantages that the size of the fuel filter device as a whole is increased and the structure is complicated because the filter container has to accomodate the heating element. In addition, this filter device cannot heat the fuel efficiently because the heating element indirectly heats the fuel either through the bottom wall of the filter container or through drain water accumulated on the bottom wall thereof.

SUMMARY OF THE INVENTION

It is a primary object of the present invention to provide a fuel filter device of the class specified above which is improved in structure as well as in operation to efficiently heat the fuel thereby to reliably prevent the filter element from being clogged due to increase in the viscosity of the fuel when the temperature is lowered below a predetermined level.

The filter device according to the present invention comprises:

a body member defining therein an inlet for fuel from a fuel tank and a fuel outlet;

a filter assembly including a container and a filter element housed therein, said container being formed therein with a first opening and detachably and sealingly attached to said body member such that said fuel outlet is in fluid-flow communication with said first opening;

manually operable pump means mounted on said body member to cooperate therewith to define a chamber adapted to be communicated with said inlet and outlet, said pump means including a diaphragm facing said chamber and an actuating member manually operable to resiliently deform said diaphragm so that a pressure variation is caused in said chamber;

valve means operatively associated with said inlet and outlet and responsive to a fuel pressure at said inlet and to the pressure variation in said chamber to control the communication between said inlet and said chamber and the communication between said chamber and said outlet;

said container being formed therein with a second opening adjacent to said filter element;

said filter assembly being constructed such that the fuel from said outlet enters said container through said first opening and flows through said container to said second opening along a path of flow, said filter element forming a part of said path of flow;

said body member further defining therein a discharge port communicated with said second opening in said container;

heating means disposed in said chamber and including a heating element adapted to be electrically energized to heat the fuel in said chamber; and means for controlling the electrical supply to said heating element.

The above and other objects, features and advantages of the invention will become clear from the following description with reference to the accompanying drawings.

DESCRIPTION OF PREFERRED EMBODIMENTS

Figure 1:
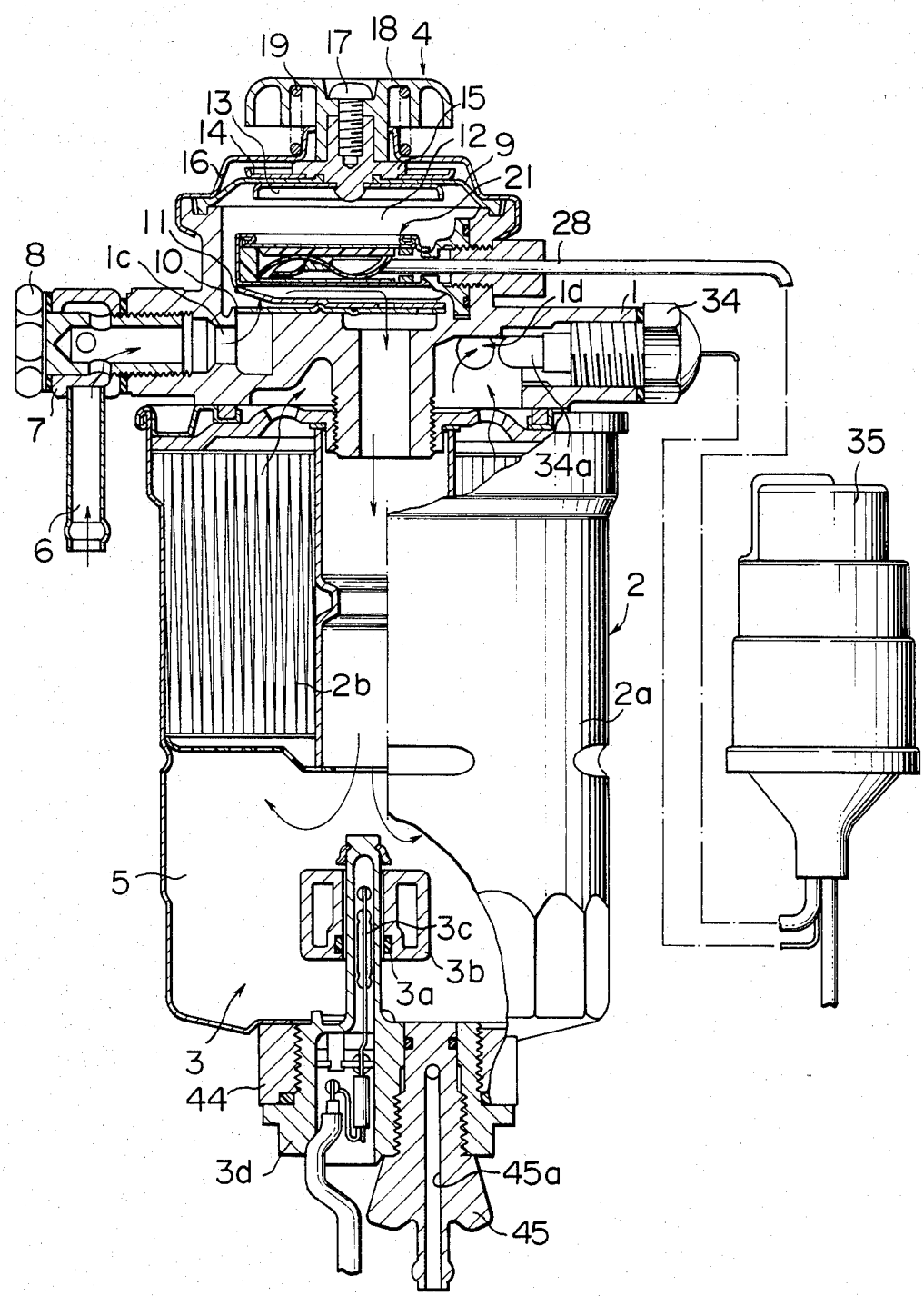
FIG. 1 is a partly sectioned front elevational view of an embodiment of the fuel filter device in accordance with the invention.

Referrig to FIG. 1, a first embodiment of the fuel filter device in accordance with the invention is constituted by a metallic upper body 1, a filter assembly 2, a level switch 3 and a hand pump 4. The filter assembly 2 is composed mainly of a metallic casing 2a and an axial-flow type filter element 2b. A space 5 for drain water is defined in the bottom portion of the metallic case 2a below the filer element 2b. A nipple 7 having a fuel inlet tube 6 is fixed to the upper body 1 by means of a bolt 8. This tube 6 is communicated with a fuel inlet port 1c formed in the upper body 1. Parts constituting the hand pump 4, such as a diaphragm 9, a valve member 10, a protector member 11 and a diaphragm chamber 12, are disposed on the upper part of the upper body 1. More specifically, the diaphragm 9 is made of a resilient material such as rubber and clamped between metallic washers 13 and 14 which are secured to a metallic mounting member 15. A metallic cover 16 is mounted on and curled onto the upper end of the upper body 1 so that the diaphragm 9 is clamped at its outer peripheral portion between the cover 16 and the upper end of the upper body 1.

The mounting member 16 has an upper end extending upwardly from the cover 16. A cup-shaped actuator 18 made of a plastic material is attached onto the upper end of the mounting member 15 by means of a screw 17. The actuator 18 is so shaped as to have a flange portion extending substantially horizontally to partly overlay the cover 16. A compression coil spring 19 is disposed between this flange portion and the cover 16. According to this arrangement, when the actuator 18 is pressed down by a hand against the coil spring 19, the mounting member 15 is lowered to deflect the diaphragm 9. However, when the actuator 18 is relieved from the manual pressing force, the coil spring 19 is allowed to expand to lift the mounting member 15 through the actuator 18 thereby to permit the diaphragm 9 to resume its initial position.

In order to supply fuel into the filter assembly 2 by making use of a pressure change in the diaphragm chamber 12 caused by the reciprocatory action of the actuator 18, the valve member 10 and the protector member 11 mentioned before are provided in the upper body 1. The valve member 10 and the protector member 11 have constructions as shown in FIG. 4.

Figure 4:
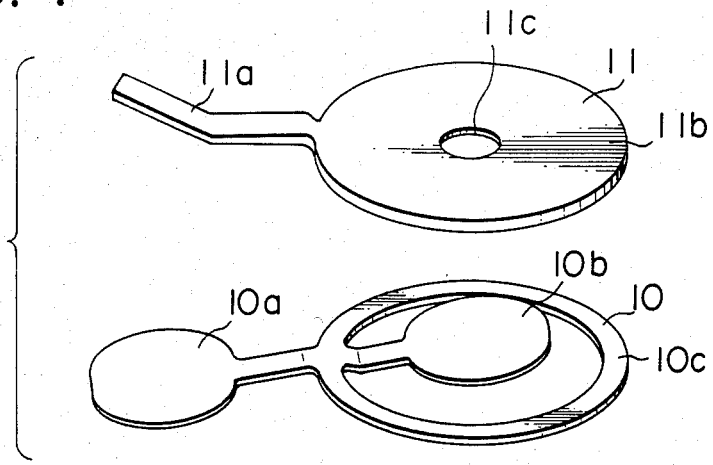
FIG. 4 shows in perspective view a valve member and a protector member incorporated in the fuel filter device shown in FIG. 1.

Namely, as shown in FIG. 4, the valve member 10 has a disc-shaped inlet portion 10a, a disc-shaped outlet portion 10b and a ring-like mounting portion 10c. These portions are formed integrally by punching a sheet of spring steel. On the other hand, the protector member 11 has a stop portion 11a for limiting the amount of deflection of the inlet portion 10a of the valve member 10, a disc-shaped portion 11b adapted to retain the outlet portion 10b and the mounting portion 10c of the valve member 10, and a through hole 11c formed in the disc-shaped portion 11b. All of these portions of the protector member 11 are formed integrally by punching a sheet of a stainless steel.

Figure 5:
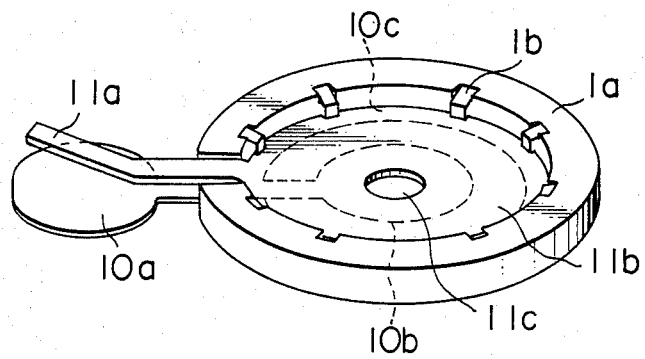
FIG. 5 is a perspective view of an assembly of the valve member and the protector member, illustrating how these members are attached to an upper body of the fuel filter device.

As shown in FIG. 5, the valve member 10 and the protector member 11 are mounted in a ring-like mounting portion 1a of the upper body 1 such that the stop portion 11a of the protector member 11 is disposed above the inlet portion 10a of the valve member 10 and the disc-shaped portion 11b of the protector member 11 is disposed on the outlet portion 10b and the mounting portion 10c of the valve member 10. The ring-like mounting portion 1a is plastically deformed at a plurality of portions along the inner periphery thereof to form claws 1b by which the outer peripheral portion of the disc-shaped portion 11b of the protector member 11 is fastened to the upper body 1.

Figure 2:
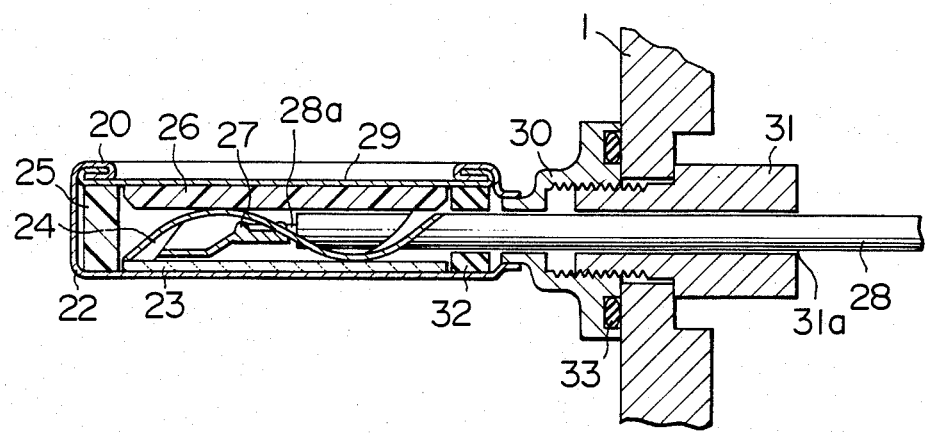
FIG. 2 is an enlarged fragmentary sectional view of the fuel filter device of FIG. 1 showing particularly a heating means and the manner of mounting of the heating means.
Figure 3:
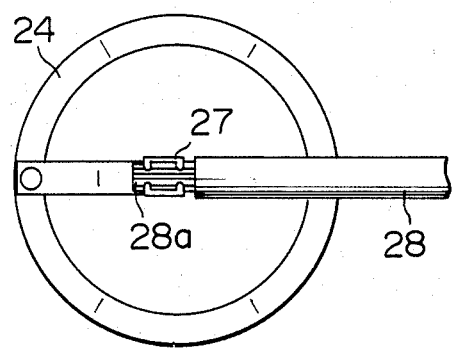
FIG. 3 is a plan view of a wave washer and a lead wire shown in FIG. 2.

Referring again to FIG. 1, a heating means 21 is disposed according to the invention in the diaphragm chamber 12. The construction of the heating means 21 will be described hereinunder with reference to FIGS. 2 and 3. The heating means 21 has a generally cup-shaped housing 22 having a bottom against which a disc-shaped heating element 23 is held by a resilient force exerted by an annular wave washer 24 which also serves as a plus (+) electrode. The housing 22 serves as the minus (−) electrode. Spacers 25 and 26 made of a heat-resistant resin are disposed in the housing 22 to electrically insulate the housing 22 from the wave washer 24.

A terminal 27 to which a core wire 28a of a cable 28 is fixed by caulking is connected to the wave washer 16 by welding. A cap member or lid 29 is fixed at its peripheral portion by curling as at 20 to the rim of the opening in the housing 22, so that the ineterior of the housing 22 is shielded from the exterior. In order to secure the housing 22 to the upper body 1, an internally threaded union 30 is fixed by welding to the housing 22. The union 30 is secured to the upper body 1 by another union 31 having a bore 31a for the cable 28. The heating means 21 further has a bushing 32 made of a heat-resistant rubber and a gas-tight elastic "O" ring 33 which are disposed in the manner shown in FIG. 2. The housing 22, the wave washer 24, the terminal 27, the lid 29 and the unions 30 and 31 are all made of metallic materails. The housing 22, in particular, is made of a material having a high heat conductivity, e.g., copper, so as to efficiently conduct the heat generated by the heating element 23.

The heating element 23 is made of a ceramics semiconductor of barium titanate group which is known as a material having a positive temperature coefficient of resistance and exhibiting a drastic rise of the resistance value at a predetermined temperature. A known double-structure electrode of Ni-Ag (not shown) is provided on each side of the heating element 23. One of the electrodes is held in contact with the housing 22.

The heating means 21 thus formed is mounted in the diaphragm chamber 12, as shown in FIG. 1, such that the bottom of the housing 22 of the heating means 21 is disposed in the close proximity of the bottom of the upper body 1.

Figure 6:
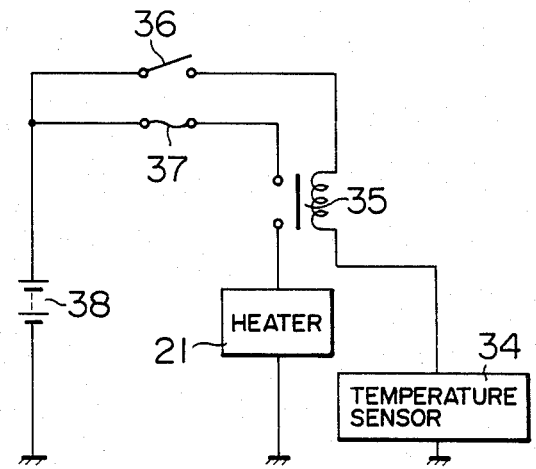
FIG. 6 is a diagram of an electric circuit for supplying electric current to the heating means of the fuel filter device shown in FIG. 1.

A known temperature sensor 34, which is composed of a thermo-ferrite (not shown) and a lead switch (not shown), is secured to the upper body 1. The sensor 34 has a temperature-sensing portion 34a positioned in the close proximity of a fuel discharge port 1d formed in the upper body 1. FIG. 6 shows the heating circuit which includes the temperature sensor 34 and the heating device 21. In operation, the temperature sensor 34 senses directly the fuel temperature at the fuel discharge port 1d and produces a signal for activating a relay 35 which in turn permits the electric power supply to the heating element 23 of the heating means 21. The lead switch of the temperature sensor 34 is arranged such that its contacts are closed when the fuel temperature is lowered below 0° C., for example. In FIG. 6, reference numerals 36, 37 and 38 denote, respectively, an ignition switch of the engine, fuse and a power source which is, in this case, a series of batteries mounted on an associated vehicle.

Figure 7:
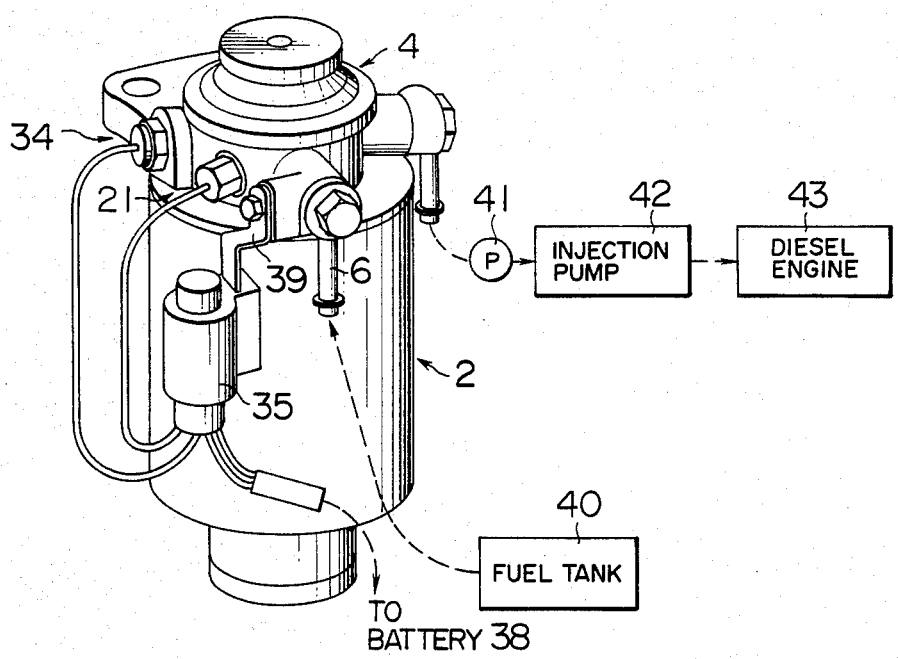
FIG. 7 is a partly perspective and partly diagrammatic view of the fuel filter device shown in FIG. 1.

As shown in FIG. 7, the relay 35 is attached to the upper body 1 through a bracket 39. In FIG. 7, reference numerals 40, 41, 42 and 43 denote, respectively, a fuel tank, fuel pump, fuel injection pump and the diesel engine, respectively.

Referring again back to FIG. 1, the level switch 3 mentioned before has a known lead switch 3c having a float 3b provided with a magnet 3a. The level switch 3 has a base portion 3d screwed into a nut portion 44 secured to the bottom wall of the container 2a of the filter assembly 2. A water drain plug 45 is screwed into a threaded drain hole formed in the base portion 3d of the level switch 3. The drain plug 45 has a vertical drain bore 45a which is adapted to be communicated with a horizontal bore (not shown) when the drain plug 45 is slightly loosened.

In operation, when the fuel pump 41 is operated, the fuel is sucked up from the fuel tank 40 and is delivered to the fuel inlet port 1c in the upper body 1 through the fuel inlet tube 6. The fuel then forcibly lifts the inlet portion 10a of the valve member 10 to flow into the diaphragm chamber 12. The fuel then downwardly depresses the outlet portion 10b of the valve member 10 to flow into the container 2a of the filter assembly 2 and is introduced through the central space in the filter element 2b into the space 5. During the time while the fuel stays in this space, the water content in the fuel is separated from the fuel by the difference in the specific gravity and is accumulated in the bottom region of the space 5.

After the separation of the water, the fuel passes through the filter element 2b in the axial direction so as to be filtrated to become clean. The cleaned fuel is then forwarded through the fuel discahrge port 1d formed in the upper body 1 to the fuel pump 42 and further to the engine 43.

When a predetermined amount of water is accmulated in the bottom region of the space 5, the float 3b of the level switch 3 floasts to cause its magnet 3a to turn the lead switch 3c on, so that a warning lamp or buzzer on an instrument panel of the vehicle is energized to inform the driver of the filling up of the space 5 with water. When this is acknowledged by the driver, he may slightly unscrew the drain plug 45 and repeatedly press the actuator 18 of the hand pump 4 to deflect the diaphragm 9 thereby to establishe pressure pulsations in the diaphragm chamber 12. In consequence, the outlet portion 10b of the valve member 10 is opened intermittently to pressurize the water surface so that the water is drained off through the vertical drain bore 45a in the drain plug 45.

The hand pump 4 is used not only for the draining of water as described but also as a priming pump for filling up the space in the filter assembly 2 with fuel, as in the case where the filter assembly 2 has just been renewed. As stated before, the interior of the filter assembly normally serves as a part of the path of the fuel flow through the filter device.

Assuming that the temperature of the fuel flowing through the fuel dischage port 1a in the upper body 1 is lowered below 0° C., the temperature sensor 34 is swtiched on, so that the relay 35 is energized to permit the electric power supply to the heating element 23 of the heating means 21 to cause the heating element to produce heat. The heat thus produced is transmitted to the housing 22. Since the bottom of the diaphragm chamber 12 is disposed in the close proximity of the bottom of the heating means 21, the fuel flowing through the diaphragm chamber 12 assumes a form of a thin sheet or layer. This thin layer of fuel is effectively heated by the heat produced by the heating means 21, so that the viscous component in the fuel is sufficiently liquidized to avoid the undesirable clogging of the filter element 2b.

The electric resistance of the heating element 23 is drastically increased when the temperature of this element reaches a predetermined level, so that the electric current flowing through this element is decreased correspondingly. Then, when the temperature of this element is lowered due to the decrease in the electric current, the electric resistance of this element is drastically decreased to increase the electric current. Thus, this heating element 23 performs a self-regulating function for regulating by it-self the electric current flowing therethrough. It is, therefore, possible to prevent overheating of the heating element 23.

Figure 8:
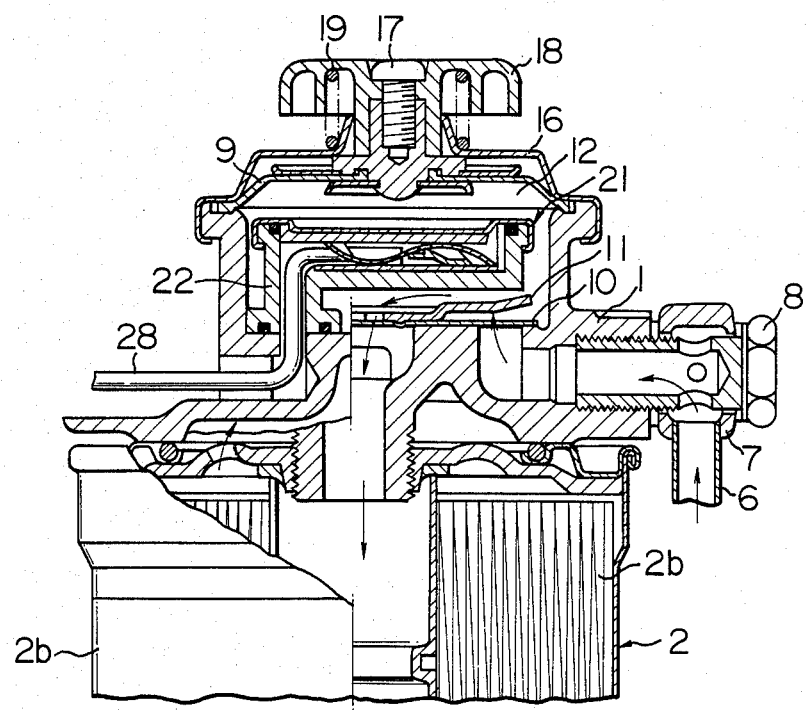
FIG. 8 is a partly sectioned, fragmentary front elevational view of another embodiment of the fuel filter device in accordance with the invention.
Figure 9A:
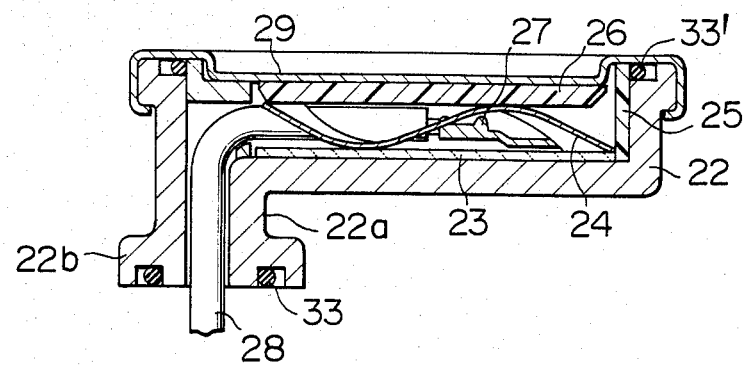
FIG. 9A is a sectional view of a heating means incorporated in the fuel filter device shown in FIG. 9.

FIGS. 8 and 9 show another embodiment of the fuel filter device in accordance with the invention. This embodiment is substantially identical to the first embodiment except for the construction of the housing 22 and the way of securing the housing 22. The explanation of this embodiment, therefore, will be focussed only to the points which distinguish this embodiment from the preceding embodiment.

Figure 9B:
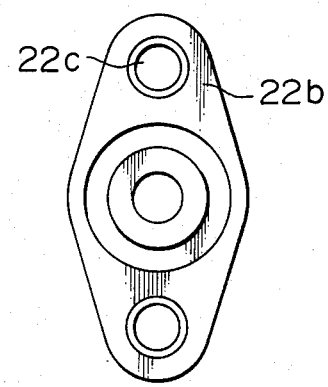
FIG. 9B is a bottom plan view of only a collor of the heating means shown in FIG. 9A.

In this embodiment, the housing 22 is made from aluminum and is provided with a collar 22a integral therewith. The collar 22a has an internal bore through which the cable 28 is led externally. The housing 22 is provided also with a mounting flange 22b which is integral with the collar 22a and formed with bolt holes 22c (see FIG. 9B) through which bolts (not shown) are screwed into the threaded holes (not shown) in the upper body 1 thereby to fix the housing 22 to the upper body 1. FIG. 9 shows only the flange 22b. The major part of the housing 22 is omitted from this drawing for the simplification thereof. In the sectional view in FIG. 8, the sectional plane is selected to show the heating means 21 so that the position of the fuel inlet tube 6 is reversed from that in FIG. 1 and the temperature sensor 34 is not visible.

Figure 10:
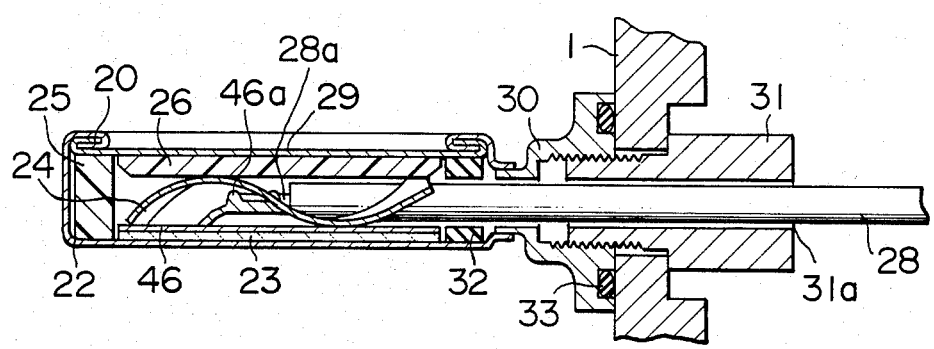
FIG. 10 is a sectional view of a heating means incorporated in a still another embodiment of the invention.
Figure 11:
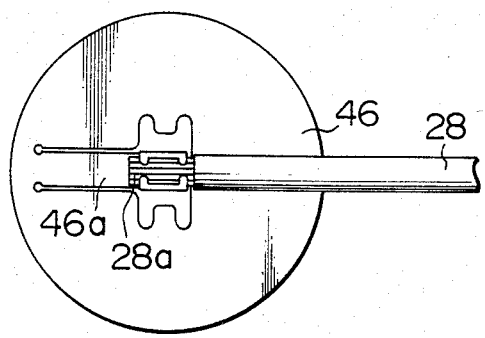
FIG. 11 is a plan view showing how a lead wire is connected to a terminal plate shown in FIG. 10.
Figure 12:
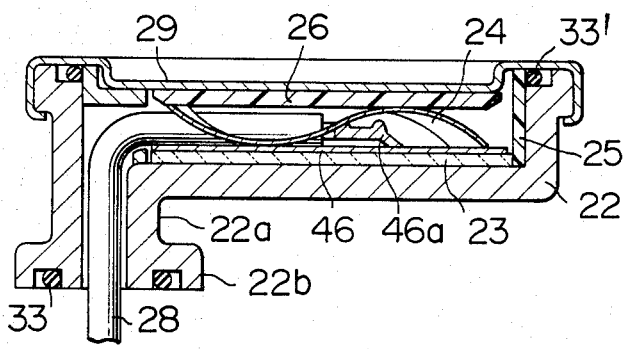
FIG. 12 is a sectional view of a heating means incorporated in a still another embodiment of the fuel filter device in accordance with the invention.

FIGS. 10 and 11 show a still another embodiment of the fuel filter device in accordance with the invention. This embodiment is different from the embodiment shown in FIGS. 1 to 3 in that a metallic terminal plate 46 is disposed between the wave washer 24 and the heating element 23 and the core wire 28a of the cable 28 is clamped by a tab 46a extending from the plate 46. Other portions are identical to those of the embodiment described hereinbefore and, thus, will not be described here.

FIG. 1 shows a further embodiment which differs from the embodiment shown in FIG. 9 only in that it employs the terminal plate 46 used in the embodiment shown in FIGS. 10 and 11. Other portions are identical to those of the embodiment shown in FIG. 9 and, thus, will not be described here.

Figure 13:
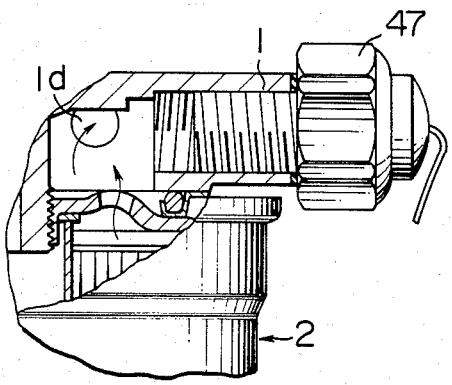
FIG. 13 is a fragmentary sectional view of a further embodiment of the fuel filter device in accordance with the invention.

FIG. 13 shows a still further embodiment of the invention. In this embodiment, a vacuum sensor 47 is used in place of the temperature sensor 34 used in the embodiment shown in FIG. 1. Other portions are identical to those of the embodiment shown in FIG. 1. The vacuum sensor 47 incorporated in the embodiment shown in FIG. 13 has a diaphragm (not shown) adapted to be deflected in response to a change in the vacuum in the region around the fuel discharge port 1d in the upper body 1. As the vacuum reaches a predetermined level, electric contacts in the sensor 34 are closed by the deflection of the diaphragm. Such a vacuum sensor is conventional and well known. This embodiment makes use of a decrease in the pressure in the region around the fuel discharge port 1d which occurs when the fuel filter element 2b has become clogged by the viscous component of the fuel due to an extraordinary low temperaure level of the fuel during operation of the fuel pump 41.

Although, in the described embodiments, a semiconductor ceramics material of barium titanate group is used as the material of the heating element 23, this material is not exclusive and the heating element 23 may be made either from any other materials having a positive temperature coefficient of resistance or from materials which do not have positive temperature coefficient of resistance. The temperature sensor may alternatively be disposed to detect the fuel temperature in the fuel tank or the fuel temperature at any portion of the fuel passage between the fuel tank and the fuel filter device. It is also possible to use the ambient air temperature in place of the fuel temperature to control the operation of the heating means 21.

The described embodiments of the present invention have the following advantages:

(1) The heating means is disposed not in the filter container of the filter assembly but in the fuel priming pump. It is, therefore, possible to avoid undesirable increase in the size and complication of the construction of the filter assembly and, hence, of the fuel filter device as a whole, while making an efficient use of the dead space within the fuel priming pump.

(2) The heating means is disposed in the path along which only fuel flows, so that the heating efficiency is appreciably increased as compared with the case of the prior art fuel filter device in which the fuel is heated through the layer or mass of drain water within the filter container.

What is claimed is:

1. A fuel filter device for use with diesel engines, comprising:
   a body member defining therein an inlet for fuel from a fuel tank and a fuel outlet;
   a filter assembly including a container and a filter element housed therein, said container being formed therein with a first opening and detachably and sealingly attached to said body member such that said fuel outlet is in fluid-flow communication with said first opening;
   manually operable pump means mounted on said body member to cooperate therewith to define a chamber adapted to be communicated with said inlet and outlet, said pump means including a diaphragm facing said chamber and an actuating member manually operable to resiliently deform said diaphragm so that a pressure variation is caused in said chamber;
   valve means operatively associated with said inlet and outlet and responsive to a fuel pressure at said inlet and to the pressure variation in said chamber to control the communication between said inlet and said chamber and the communication between said chamber and said outlet;
   said container being formed therein with a second opening adjacent to said filter element;
   said filter assembly being constructed such that the fuel from said outlet enters said container through said first opening and flows through said container to said second opening along a path of flow, said filter element forming a part of said path of flow;
   said body member further defining therein a discharge port communicated with said second opening in said container;
   heating means disposed in said chamber and including a heating element adapted to be electrically energized to heat the fuel in said chamber; and
   means for controlling the electrical supply to said heating element.

2. A fuel filter device according to claim 1, wherein said heating element is made of a ceramics material having a positive temperature coefficient of resistance.

3. A fuel filter device according to claim 1, wherein said controlling means include:
   an electric power source;
   a temperature sensor mounted on said body member to detect the temperature of the fuel, said temperature sensor emitting an electrical signal when the fuel temperature thus detected is lower than a predetermined level; and
   switching means responsive to said electrical signal to electrically connect said power source to said heating element.

4. A fuel filter device according to claim 1, wherein said discharge port is hydraulically connected to a power-driven pump operative to pump the fuel from said fuel tank through said filter device to a diesel engine, and wherein said controlling means includes:
   an electric power source;
   a pressure sensor mounted on said body member to detect the pressure of the fuel downstream of said filter element, said pressure sensor emitting a signal when the fuel pressure thus detected is lower than a predetermined level; and
   switching means responsive to said signal to electrically connect said power source to said heating element.

5. A fuel filter device according to claim 1, wherein said heating means further include a closed housing in which said heating element is disposed adjacent to a wall of said casing, and wherein said casing is disposed in said chamber such that said wall is directed to said valve means to cooperate therewith to define a gap therebetween, said inlet and outlet being arranged such that the fuel entering said chamber through said inlet flows through said gap to said outlet.

6. A fuel filter device according to claim 5, wherein said housing is formed by a generally cup shaped member and a cap member sealingly secured to said cup shaped member and wherein said wall comprises a bottom wall of said cup shaped member.

7. A fuel filter device according to claim 1, wherein said discharge port is hydraulically connectd to power-driven pump means operative to pump the fuel from said fuel tank through said filter device to a diesel engine, and wherein said controlling means includes: an electric power source, means detecting the condition of the fuel in which the viscosity of the fuel is increased to a level at which said filter element is substantialy clogged, said detecting means emitting a signal when said condition is detected, and switching means responsive to said signal to electrically connect said power source to said heating element whereby the fuel is heated in said chamber.

8. A fuel filter device according to claim 7, wherein said heating means further includes a closed housing in which said heating element is disposed adjacent to a wall of said housing, and wherein said valve means comprise first and second valves associated with said inlet and outlet, respectively, said valves being made of a resilient sheet metal, and valve seats disposed to cooperate with said valves, said housing being disposed in said chamber such that said wall of said housing is directed toward said valve means to cooperate therewith to define a gap through which the fuel flows from said inlet toward said outlet.

9. A fuel filter device according to claim 8, wherein said container is generally cylindrical and has a top in which said first and second openings are formed, said filter element is generally annular and disposed in said container in an upper part thereof substantially coaxially with said first opening and has a bottom end spaced from a bottom wall of said container to provide a space therebetween, an upper part of said space forming another part of said path of flow of said fuel through said container.

10. A fuel filter device according to claim 9, wherein the bottom wall of said container is provided with a water draining means, and wherein said filter assembly further includes a float member disposed in a lower part of said space to detect the level of water accumulated in said space.

* * * * *